(12) United States Patent
Clark et al.

(10) Patent No.: US 7,092,927 B2
(45) Date of Patent: Aug. 15, 2006

(54) CONFLICT ASSESSMENT SYSTEM TOOL

(75) Inventors: Mark A. Clark, Washington, DC (US);
Pauline H. Baker, Washington, DC (US); Anne V. Russell, Washington, DC (US)

(73) Assignee: The Fund for Peace Corporation, Washington, DC (US)

( * ) Notice: Subject to any disclaimer, the term of this patent is extended or adjusted under 35 U.S.C. 154(b) by 828 days.

(21) Appl. No.: 09/891,311

(22) Filed: Jun. 27, 2001

(65) Prior Publication Data

US 2003/0004954 A1 Jan. 2, 2003

(51) Int. Cl.
*G06F 17/18* (2006.01)
*G06N 5/02* (2006.01)

(52) U.S. Cl. .................. 706/50; 706/45; 706/46; 706/933; 705/7; 705/10

(58) Field of Classification Search ............ 705/7, 705/8, 9, 10, 11; 706/45, 46, 50, 925, 932, 706/933
See application file for complete search history.

(56) References Cited

U.S. PATENT DOCUMENTS 5,680,305 A * 10/1997 Apgar, IV .................. 705/10
5,850,516 A * 12/1998 Schneier .................... 713/200
6,064,970 A * 5/2000 McMillan et al. ............ 705/4
6,718,342 B1 * 4/2004 Schultz et al. ........... 707/104.1

OTHER PUBLICATIONS

Mumpower, Jeryl; et al, Expert Judgments of Political Riskiness; Journal of Forecasting, vol. 6. 51-65. 1987.*
Olonisakin, Funmi, Conflict Management in Africa: The Role of the OAU and Subregional Organizations.*
Brandt Scott, Evaluating Information on the Internet.*
State department website sample page.*
Philip Schrodt, Event Data in Foreign Policy Analysis, Oct. 1993.*
Carnege Mellon University, Commercial Software Models, 1995.*
Pauline Baker Democracy and Governance: Justice and Security, Jun. 7, 2000.*

* cited by examiner

*Primary Examiner*—Anthony Knight
*Assistant Examiner*—Sergey Datskovskiy
(74) *Attorney, Agent, or Firm*—Pepper Hamilton LLP

(57) ABSTRACT

Methods and apparatus for performing conflict assessments conducted by a software tool, which are particularly suited for monitoring internal conflicts of various countries are disclosed. An application of this method and apparatus to the international community is also disclosed.

17 Claims, 5 Drawing Sheets

CONFLICT ASSESSMENT SYSTEM TOOL

COPYRIGHT PROTECTION

This disclosure contains material which is subject to copyright protection. The copyright owner has no objection to the reproduction by anyone of the patent document or the patent disclosure as it appears in the Patent and Trademark Office patent file or records, but otherwise reserves all copyright rights. The following notice applies to the software and data as described below and in the drawings hereto: Copyright 2001 The Fund for Peace. All rights reserved.

FIELD OF THE INVENTION

The present invention relates generally to data assessing processes. More particularly, the present invention relates to a data assessing process and method of predetermining possible areas or regions of conflict throughout the world.

BACKGROUND OF THE INVENTION

Since the end of the Cold War, according to the US Department of State, approximately 100 armed conflicts have erupted worldwide, 35 of which stem from internal disputes based on identity. Collectively, such crises have come to be described generally as "ethnic conflict," a term that refers to inter-group violence based on language, religion, race, ethnicity, sect, class, caste, clan or some combination of these. Such identity wars collectively may be referred to as internal conflict.

While weapons proliferation and terrorism remain serious potential security threats, internal conflict represents the most lethal and actual security threat of our time. Since the fall of the Berlin Wall, more people—some estimates put the total as high as 5 million—have died from internal conflict than from international terrorism and interstate wars combined. Far greater casualties could result from a second generation of failed states, particularly in more populous societies.

Anticipating and assessing such conflict is highly complex. It requires extensive knowledge of the societies at risk, as well as the ruling elites, history, culture, demography and economy. Also critical is an understanding of the specific social groups in those societies and their political relationships to each other and to the state. These factors cannot be analyzed by quantitative techniques alone. Another complexity is the fluidity of group identity in such disputes. All individuals hold multiple social identities Each becomes relevant for different purposes in different situations. Shifting identities is not uncommon in conflict that target civilians.

The development of better diagnostic and analytical tools for early warning and policy assessment is needed, both to prevent military intervention, if possible, and to improve preparation, when necessary. Thus far, such methodologies remain elusive. Existing works tend to be too general, lack policy-relevance, verify the obvious or are of limited practical utility. Studies that rely exclusively on quantitative techniques fail to capture key variables that are not subject to statistical verification. They often oversimplify complex situations, lack the texture of "ground truth" in countries at risk, and do not provide an overall analytical framework. Some have argued that we already have adequate early warning from humanitarian workers, human rights organizations, diplomats and international organizations. However, these are actually late warnings that usually sound the alarm after the fire has broken out, when it is often too late to put out the blaze. Early warning should alert the international community before the combustion actively ignites, in sufficient time to respond to and prevent it, hopefully without military intervention.

Furthermore, while the international community has devoted significant attention to post-conflict strategies and the definition of missions for military intervention, it still lacks adequate tools to enable analysts to track a conflict over time—before, during and after violence—so that policy makers can provide continuity in an integrated response over the duration of the conflict and its resolution.

The present invention addresses some of these needs. It presents a methodology to better anticipate, analyze and assess a country at risk as it teeters between war and peace. It can be utilized by multinational organizations, such as NATO, international organizations, such as the UN or World Bank, individual state governments, intelligence analysts, scholars and researchers. The present invention should not be construed as a paradigm for all conflicts (such as revolutionary, ideological or territorial wars), although elements could be adapted and applied to conflicts involving states with homogenous populations. Neither should the present invention be seen as a prescription for specific policies, a formula for predicting international humanitarian responses, or a mechanism for addressing questions of political will or national interest. The present invention may strengthen the capacity of the international community to anticipate and respond more effectively to impending catastrophes. At the very least, leaders will not be able to say that they did not fully appreciate what was happening.

SUMMARY OF THE INVENTION

The foregoing needs have been satisfied to a great extent by the present invention wherein, in one aspect of the invention, a Conflict Assessment System Tool (CAST) has been designed to serve as a conflict early warning and recovery assessment system. CAST uses the technologies of relational database theory and fourth generation languages to help create an off-the-shelf, user-friendly and practical tool for international decision makers involved in conflict risk assessments and policy responses.

CAST uses a comprehensive analytical model to anticipate impending conflicts worldwide. In developing CAST, the most sophisticated information technologies available was used, integrating video and/or audio clips, digital photos, documents, and other data sources into its interactive, user-friendly interface. CAST processes data from multiple sources, organizes it, and creates graphic displays that identify major social, political/military, and economic trends that track the increase or reduction of conflict. It also creates a standard database methodology for collecting, sorting, and analyzing information relevant to internal conflicts around the world. Software-based products provide a comparative advantage by assuring a foundation of analytical information that is easily accessible, simple to update, and that can be used to produce any number of products over time. CAST may also be customized to incorporate both open-source and privileged data. More than just a number-crunching software program, CAST produces precise and reliable analysis on conflict, providing policy-makers with information they can use.

CAST software provides the additional benefit of allowing the client to access and update information, and produce independent, customizable reports from an integrated software platform on a daily, weekly, or monthly basis. CAST data may also include additional audio/video information that can be incorporated into news clips, documentaries, and other integrated visual presentations for use by the client. CAST software is compatible with Windows™, Mac OS-10™ and Linux™ systems. It can be available on CD-ROM, can be integrated into a LAN or WAN system, or be web-enabled.

CAST utilizes the following key client features: ability to automatically document, measure, and evaluate the intensity of key indicators of conflict; ability to compare conflicts, and assess the factors that contribute to violence over different historical periods; ability to test and verify the estimates of prominent state and international factors on the risk of conflict and the assessment of recovery from conflict; ability to identify and assess the critical social, economic, or political factors that most often contribute to conflict; ability to graph trends and track the risk of violent conflict and post-conflict recovery; and ability to assess the effectiveness of intervention strategies and the extent to which they contribute to sustainable security.

Furthermore, CAST utilizes the following key technical features: SQL-92 compliance; built-in query and report generator with pre-defined formatted reports; able to organize, store, retrieve, and display hundreds of facts and information about specific countries in both narrative and graphical form; able to handle billions of records containing up to 64,000 bits of information each; able to store any type of data from documents, radio broadcasts, television interviews, maps, graphics, and all web media; able to be a web portal; able to work as a stand-alone desktop application or on a server able to handle hundreds of clients; able to export/import data to over a hundred data formats; and able to allow key word indexing and searching.

In addition, CAST utilizes the following twelve top indicators of internal conflict and state collapse: (1) mounting demographic pressures; (2) massive movement of refugees or internally displaced persons creating complex humanitarian emergencies; (3) legacy of vengeance-seeking group grievance or group paranoia; (4) chronic and sustained human flight; (5) uneven economic development along group lines; (6) sharp and/or severe economic decline; (7) criminalization and/or deligitimization of the state; (8) progressive deterioration of public services; (9) suspension or arbitrary application of the rule of law and widespread violation of human rights; (10) security apparatus operates as a "state within a state"; (11) rise of factionalized elites; and (12) intervention of other states or external political actors.

A method of conflict assessment is yet another aspect of the invention, in which a user selects a country and time frame to analyze. Next, CAST receives this data input and then determines if the internal database contains enough information to perform a base assessment of the selected country. CAST then analyzes the data to measure the 12 indicators of conflict mentioned above and to ascertain the relative levels of these indicators in order to determine the selected country's level of conflict. CAST next compares the present state of each indicator and the cumulative value of the indicators against past assessments to determine changes in the state of conflict and the differences among the contributing factors. CAST finally determines and prepares outputs or reports such as warnings or alerts, conflict assessments, and policy options.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
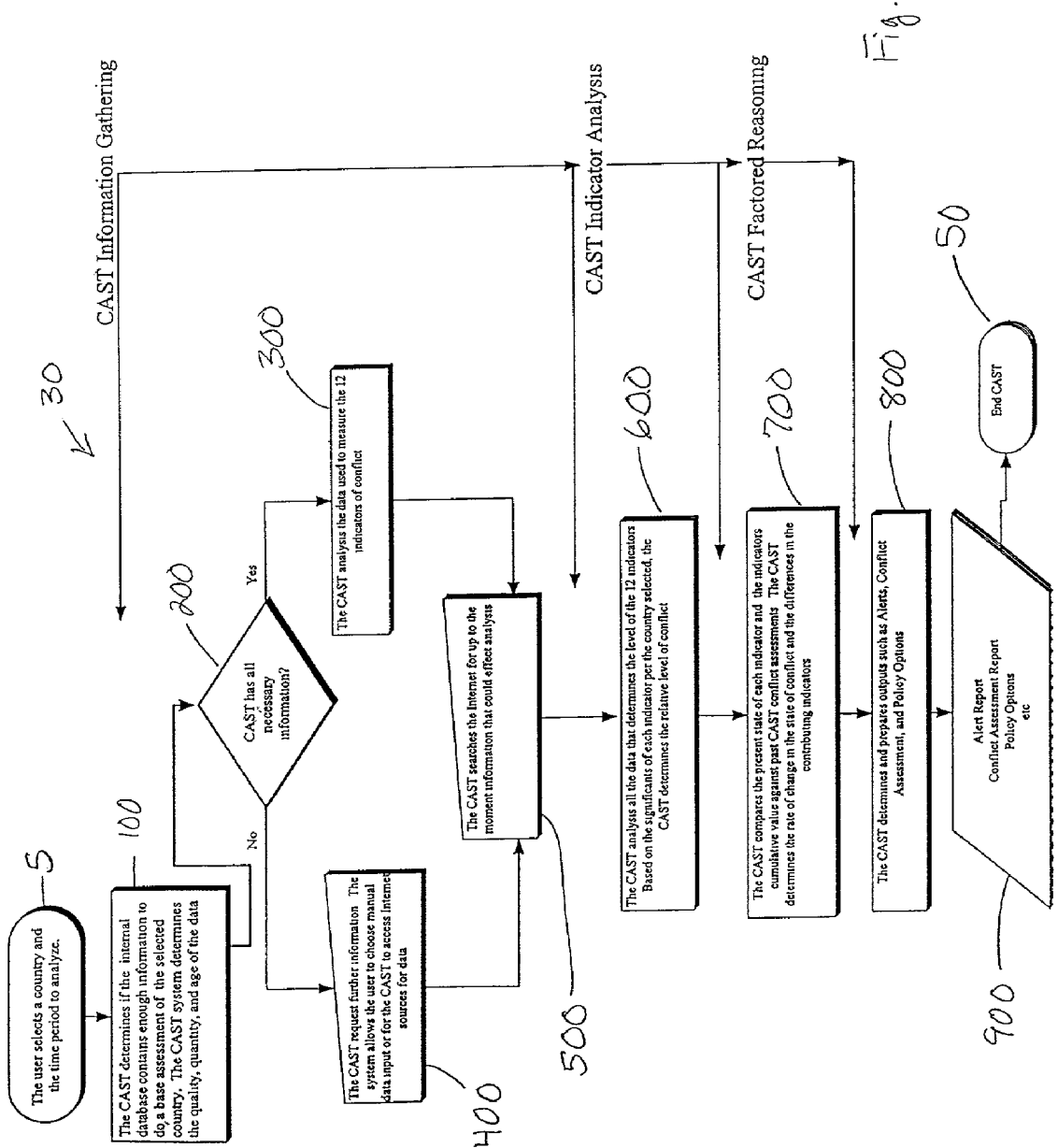
FIG. 1 illustrates a flowchart of a preferred embodiment of the present invention.

Referring to FIG. 1, the CAST process 30 is implemented through a computer program written in any language suitable for technologies of relational database theory and fourth generation languages. In the preferred embodiment, the CAST process 30 is written in any programming language which can be compatible with Windows™, Mac OS-10™ and Linux™ systems. The CAST process 30 will operate on any computer system (not shown) which has the capability to with the following minimum requirements: 486 or higher processor; Microsoft Windows™ 95/98/2000 or Microsoft Windows™ NT; 64MB RAM; 100 MB disk space; and CD-ROM drive. In the preferred embodiment the CAST process 30 under the Microsoft Windows™ 98 operating system.

The CAST process 30 may be conveyed to a computer system on any media from which the computer system is capable of meeting the above minimum requirements, and the results of the CAST process 30 may be recorded on any medium upon which the computer system is capable of recording.

In the preferred embodiment, the CAST process 30 is "manufactured" onto an industry-standard CD-ROM (not shown) which may be stored for an indefinite amount of time until it is needed. In the preferred embodiment, operation of the CAST process 30 is initiated by loading the CD-ROM onto the computer system in a standard manner. The CAST process 30 then begins by the user selecting a country and the time period of interest to analyze 5.

Figure 2:
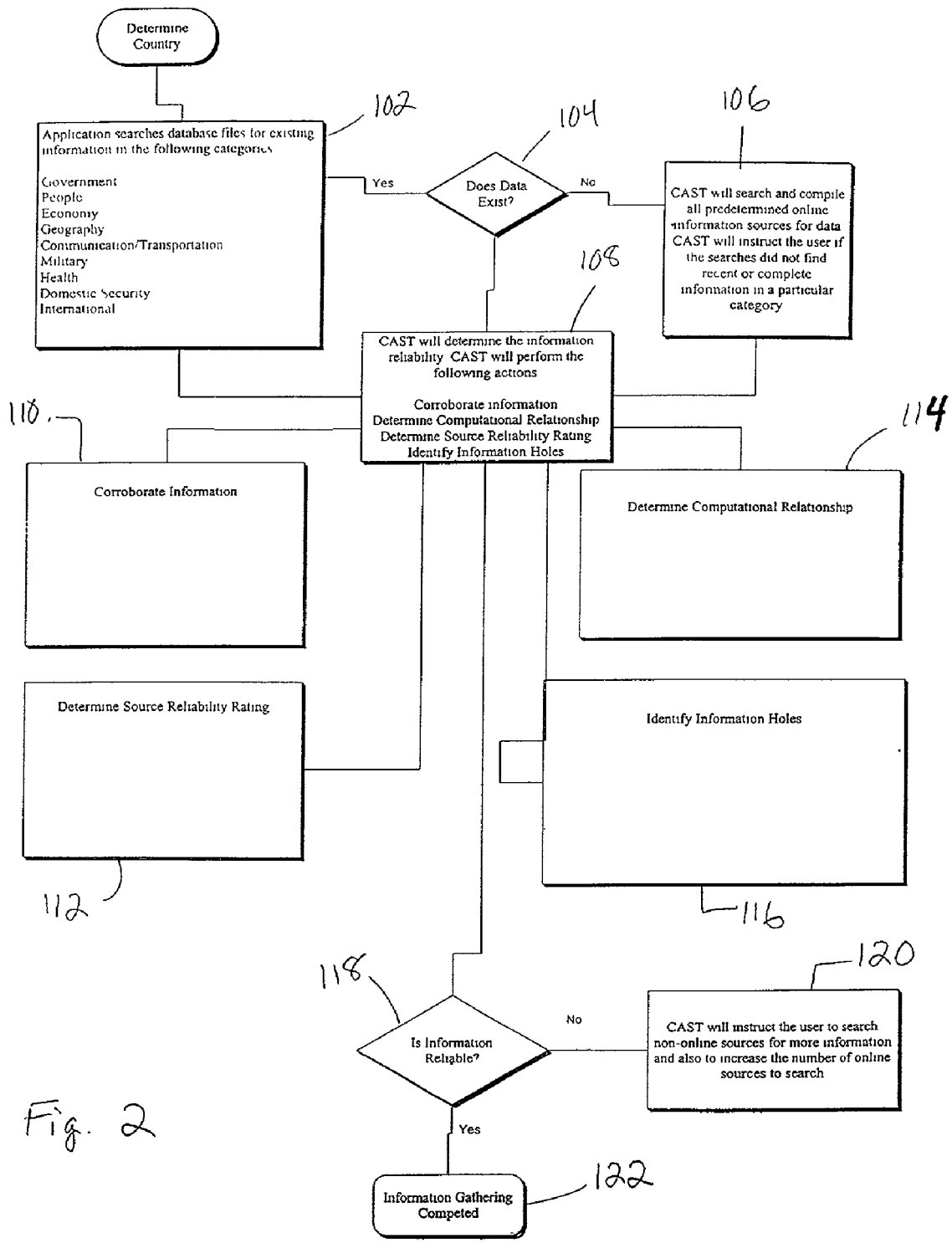
FIG. 2 illustrates a detailed flowchart of the information gathering portion at reference numeral 100 in FIG. 1.

The CAST 30 determines if the internal database contains enough information to do a base assessment of the selected country. The CAST system determines the quality, quantity, and age of the data by utilizing an information gathering step 100. Referring to FIG. 2, this information gathering step 100 searches database files for existing information in the following nine categories: (1) Government; (2) People; (3) Economy; (4) Geography; (5) Communication/Transportation; (6) Military; (7) Health; (8) Domestic Security; and (9) International 102. CAST 30 then questions if this categorical data exists 104. If this categorical information does not exist, CAST 30 will search and compile all predetermined online information sources for data (e.g., the web sites of World Bank: Aid Effectiveness Research; Human Rights Watch; Integrated Regional Information Networks; or Amnesty International). CAST 30 will instruct the user if the searches did not find recent or complete information in a particular category 106. If the categorical information does exist or is found, CAST 30 will determine if the information is reliable. CAST 30 corroborates the information, determines a computational relationship, determines source reliability ratings, and identifies any informational holes 108.

Corroborate Information

Step 110 of CAST 30 will perform text searches and compare the number of different sources reporting the same information. Each bit of information will have a corroboration rate which is a computation of the number of sources, computational relationship rate, and the source reliability rating of the source 110.

Determine Source Reliability Rating

Step 112 of CAST 30 will keep a running reliability rating of all information sources. CAST 30 will determine the reliability by applying a computation of the differences in information from the source compared to the same category of information reported from a core of five world sources that include the CIA, NY Times, CNN, BBC, and NPR Determine Computational Relationship Step 114 of CAST 30 contains theories of relationships between information about a selected country. When new information is gathered, CAST 30 will compare the information against the relationships that should be there if the information is accurate.

Identify Information Holes

Step 116 of CAST 30 will determine if any of the 9 categories of information needed to have a complete country file is incomplete. Each category has a list of facts that comprise the category. CAST 30 weights the information based on a determination of the influence of the information on the whole category. CAST 30 will measure the new information to determine if the category has sufficient weighted information in each category.

Next, CAST 30 asks if the information is reliable 118. If the answer is no, then CAST 30 will instruct the user to search non-online sources for more information and also to increase the number of online sources to search 120. If the answer is yes, then the information gathering process is complete 122 and the process continues to the next step 200.

Step 200 asks if CAST 30 has all the necessary information. If the answer is no, then CAST 30 requests further information. The system allows the user to choose manual data input or for the CAST 30 to access Internet sources for additional data 400. If the answer is yes, then the CAST 30 analyzes the data used to measure the 12 indicators of conflict mentioned above 300. Once either Step 300 or 400 is completed, CAST 30 searches the Internet for up to the moment information that could effect analysis 500.

Figure 3:
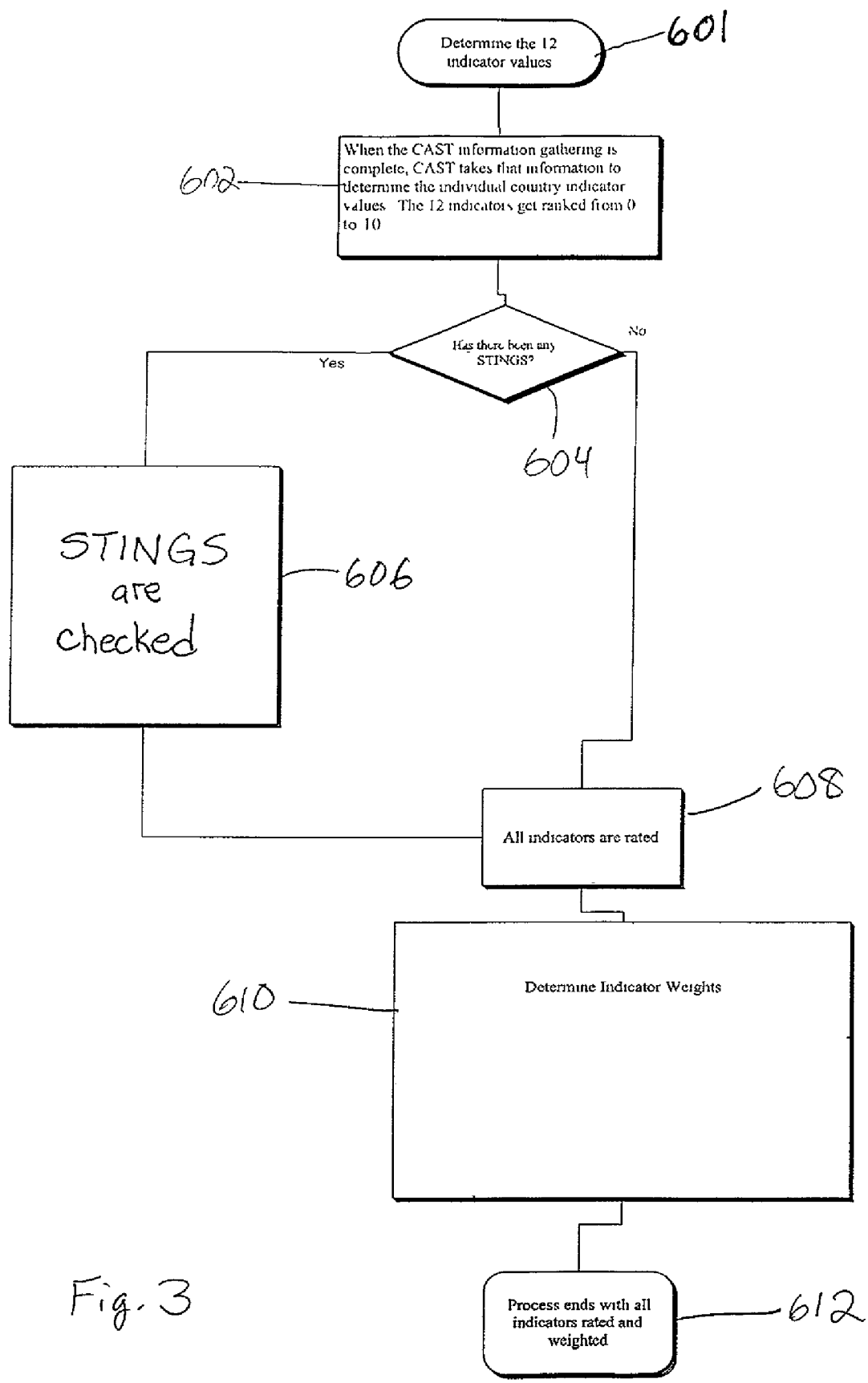
FIG. 3 illustrates a detailed flowchart of the indicator analysis portion at reference numeral 600 in FIG. 1.

Now, the indicator analysis 600 analyzes all the data that determines the level of the 12 indicators. Based on the significance of each indicator per the country selected, the CAST 30 determines the relative level of conflict. Indicator analysis 600 determines the 12 indicator values 601. Referring to FIG. 3, when the CAST 30 information gathering steps 100–500 are complete, CAST 30 takes that information to determine the individual country indicator values. The 12 indicators get ranked from zero to ten 602. CAST 30 is pre-programmed with suggested factors (measures) that an analyst can use to assess the 12 indicators. Each factor is assigned a level of maintenance (LOM) and a value of significance (VOS). The LOM is the highest point at which that specific factor can go before the fact should be a concern to policy makers. The value of VOS is important in determining the value of the indicator. The LOM is determined by a group of independent country experts. CAST 30 uses the comparison between the actual factor value against the LOM to assign an appropriate rating. CAST 30 uses the degree of the delta from the LOM to assign a value from one to ten given the LOM equals the highest point of the stable range for the factor. CAST 30 calls this value the level of maintenance multiplied result (LOMMR). CAST 30 multiplies the LOMMR times the VOS divided by the number of factors chosen to determine the individual indicator value.

Step 604 asks has there been any Surprises, Triggers, Idiosyncrasies, National Temperament, and Spoilers (STINGS) or anomalies. If the answer is yes, then the CAST 30 determines, based on the STINGS, how to apply the information to the rating process 606. STINGS can range from sudden currency collapse and recent assassinations to any sudden environmental catastrophe. The STINGS can alter the individual indicator rating or all the ratings. If the answer is no, then all indicators are rated 608. CAST 30 is pre-programmed with the particular incidences that should comprise the STINGS for each selected country. Again, some examples of STINGS are presidential assassinations, massive flooding, massive outbreak of a deadly disease, and currency collapse. The STINGS also include a country's national temperament and history of violence or a country's ability to absorb economic and political disaster without a de-stabilization of the State. Country experts determine and assess the significance of the STINGS for their particular State. The country experts also determine which factors and indicators should be affected by the STINGS (SF). The SF is a value between zero and five. If a STING occurs, CAST 30 will add the pre-programmed SF to the factor associated with the STING.

Determine Indicator Weights

CAST 30 analyzes the indicators to determine the relative influence each indicator has on a selected country's movement towards or from conflict 610. The analysis is both general and country specific. CAST 30 monitors the changes in the data that contributes to the indicators in an effort to measure those changes compared to the selected country's overall conflict status. If CAST 30 determines a correlation, CAST 30 will alter the indicator weight in a relation to the correlation. CAST 30 uses the equation:

$$(\text{LOMMR}+\text{SF})/\text{No. of Factors Selected}*\text{VOS}/\text{No. of Factors Selected}$$

This equation determines the final value of the individual indicators. Once the indicator values are determined, CAST 30 will multiply the indicator by the indicator weights (IW). The IW is a pre-programmed factor determined by country experts. The IW is a percentage from zero to 100. The IW's must add up to 100. CAST 30 will multiply the indicator by 1.5 times the number of standard deviations from the median. The indicator analysis 600 ends with all indicators rated and weighted 612.

Next, the factored reasoning step 700 compares the present state of each indicator and the indicators' cumulative value against past CAST 30 conflict assessments. The CAST 30 determines the rate of change in the state of conflict and the differences in the contributing indicators.

Figure 4:
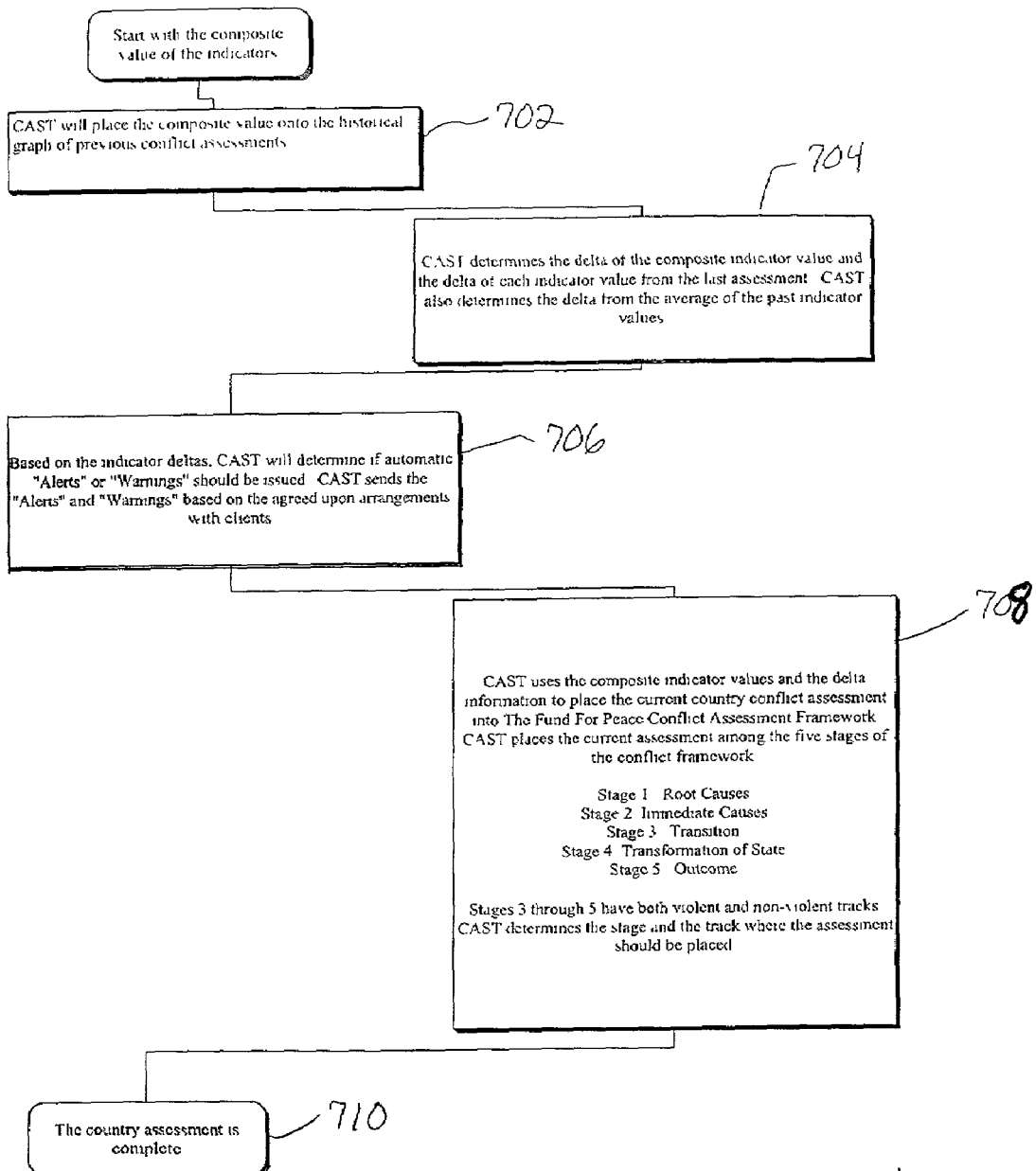
FIG. 4 illustrates a detailed flowchart of the factored reasoning portion at reference numeral 700 in FIG. 1.

Referring to FIG. 4, starting with the composite value of the indicators from step 612, CAST 30 will place the composite value onto the historical graph of previous conflict assessments 702. Then, CAST 30 determines the delta of the composite indicator value and the delta of each indicator value from the last assessment. Cast also determines the delta from the average of the past indicator values 704. Based on the indicator deltas, CAST 30 will determine if automatic "Alerts" or "Warnings" should be issued. CAST 30 sends the "Alerts" and "Warnings" based on the agreed upon arrangements with clients 706.

Figure 5:
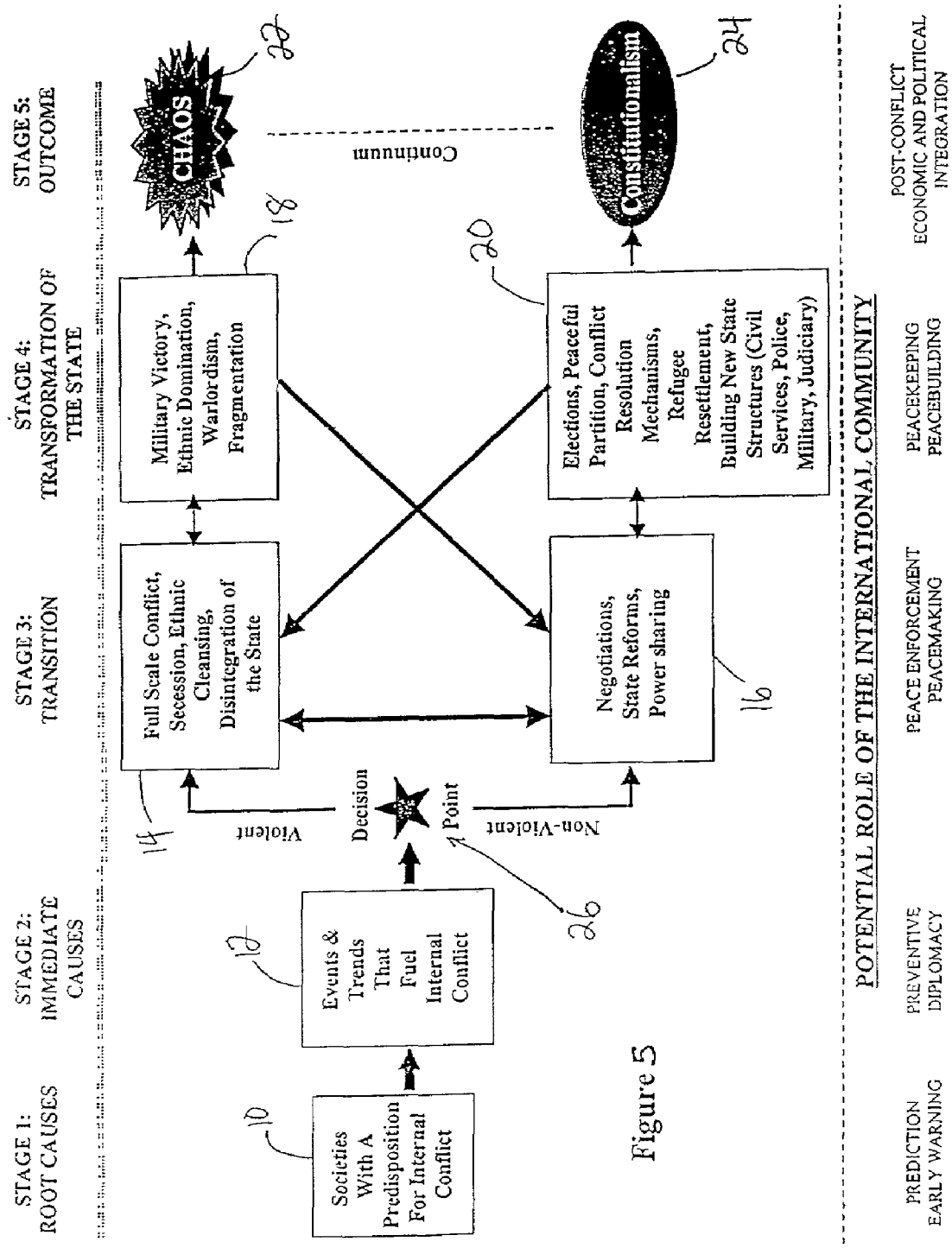
FIG. 5 shows a block diagram of a preferred embodiment of the present invention indicating the conceptual framework for analyzing internal conflict.

Now, CAST 30 uses the composite indicator values and the delta information to place the selected country conflict assessment into the conflict assessment framework (see FIG. 5). CAST 30 places the current assessment among the five stages of the conflict assessment framework: Stage 1: Root Causes; Stage 2: Immediate Causes; Stage 3: Transition; Stage 4: Transformation of State; and Stage 5: Outcome. Stages 3 through 5 have both violent and non-violent tracks. CAST 30 determines the state and the track where the assessment should be placed 708. The selected country assessment is now complete 710.

Referring to again FIG. 5, the conflict assessment framework comprises the five stages mentioned above. Stage 1 can include societies with a predisposition for internal conflict 10. The international community can use this stage as a prediction of early warning. Stage 2 can include events and trends that fuel internal conflict 12. The international community can use this stage to initiate preventive diplomacy. Stage 3 can include a violent path of full scale conflict, secession, ethnic cleansing, and disintegration of the State 14 or a non-violent path of negotiations, State reforms, and power sharing 16. This is a point of decision 26 as to what path will ensue. At times there can be transition between these paths. The international community can use this stage to start peace enforcement or peacemaking efforts. Stage 4 can include also a violent path of military victory, ethnic domination, warlordism, and fragmentation 18 or a non-violent path of elections, peaceful partition, conflict resolution mechanisms, refugee resettlement, building new State structures 20 (e.g., civil services, police, military, judiciary). There can be transitions between paths back to Stage 3 of violence and non-violence. The international community can use this stage to begin peacekeeping or peacebuilding efforts. Finally, stage 5 can be a continuum of chaos 22 or constitutionalism 24. The international community can use this stage of initiate post-conflict assistance or economic and political integration.

The CAST 30 determines and prepares outputs such as Alerts, Conflict Assessments, and Policy Options 800. These Alerts, Conflict Assessments, and Policy Options are printed out 900 before CAST 30 ends 50.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A method of conflict assessment using a relational database stored on a source medium loaded onto a computer system, comprising the steps of:
    selecting a country and time period to analyze;
    determining if the database contains enough-information to perform a base assessment of the selected country;
    gathering up-to-the-moment information by Internet searches;
    analyzing the information to determine a plurality of internal conflict indicators;
    factoring the present state of each indicator and the indicator's cumulative value against past conflict assessments by determining the rate of change in the state of conflict and the differences in the contributing factors; and
    outputting the assessment data results for a user to view;
    wherein the step of determining the rate of change in the state of conflict and the differences in the contributing factors further comprise the steps of:
    placing a composite value of the indicators onto a historical graph of previous conflict assessments;
    determining the delta of the composite value and the delta of each indicator value from the last assessment;
    determining if automatic alerts or warnings should be issued based on predetermined criteria; and
    placing the composite values and the delta information of the selected country onto a conflict assessment framework, wherein said framework comprises five stages of conflict that track where the selected country falls with respect to the probability of conflict arising.

2. The method of claim 1, wherein the step of determining if the database contains enough information further comprises the steps of:
    searching all pre-determined online sources;
    searching database files; and
    determining the information reliability.

3. The method of claim 2, wherein said database files include categories of government, people, economy, geography, communication/transportation, military, health, domestic security, and international areas.

4. The method of claim 2, wherein the step of determining the information reliability further comprises the steps of:
    corroborating information;
    determining computational relationships;
    identifying informational holes; and
    determining source reliability ratings.

5. The method of claim 1, wherein said source medium is a high density 3 ½ inch diskette.

6. The method of claim 1, wherein said source medium is a CD-ROM disk.

7. The method of claim 1, wherein the step of analyzing the information to determine the level of indicators further comprises the steps of:
    determining indicator rankings for the selected country;
    determining each indicator's weighted values for the selected country; and
    determining the presence of anomalies that effect the ranked indicators.

8. The method of claim 1, wherein the five stages include root causes, intermediate causes, transition, transformation of the State and outcome.

9. A method of conflict assessment using a relational database stored on a source medium loaded onto a computer system, comprising the steps of:
- selecting a country and time period to analyze;
- determining if the database contains enough information to perform a base assessment of the selected country;
- gathering up-to-the-moment information by determining indicator rankings for the selected country, determining each indicator's weighted values for the selected country, and determining the presence of anomalies that effect the ranked indicators;
- factoring the present state of each indicator and the indicators' cumulative value against past conflict assessments by determining a rate of change in the state of internal conflict and the differences in the contributing factors; and
- outputting the assessment data results of a user to view;
- wherein the step of determining the rate of change in the state of conflict and the differences in the contributing factors further comprises the steps of;
- placing a composite value of the indicators onto a historical graph of previous conflict assessments;
- determining the delta of the composite value and the delta of each indicator value from the last assessment;
- determining if automatic alerts or warnings should be issued based on pre-determined criteria; and
- placing the composite value and the delta information of the selected country onto a conflict assessment framework, wherein said framework comprises five stages of conflict that track where the elected country falls with respect to the probability of conflict arising.

10. The method of claim 9 wherein said five stages include root causes, intermediate causes, transition, transformation of the State, and outcome.

11. A conflict assessment method, comprising maintaining a relational database of information relating to countries, qualitative indicators and quantitative indicators;
- updating the database with current information;
- analyzing the information to determine a plurality of internal conflict indicators for a country; and
- determining a rate of change of conflict in the country.

12. The method of claim 11, wherein the qualitative indicators comprise legacy of vengeance-seeking group grievance or group paranoia.

13. The method of claim 11, wherein the qualitative indicators comprise criminalization and/or delegitimization of the country.

14. The method of claim 11, wherein the qualitative indicators comprise the operation of a security apparatus as a state within a state.

15. The method of claim 11, wherein the qualitative indicators comprise rise of factionalized elites.

16. The method of claim 11, wherein the qualitative indicators comprise intervention of other states.

17. The method of claim 1, wherein the conflict assessment is an internal conflict assessment within the selected country.

* * * * *